United States Patent Office

2,726,218
Patented Dec. 6, 1955

2,726,218

HYDROGENATION OF CARBON MONOXIDE WITH TUNGSTITE CATALYST

Herrick R. Arnold, Wilmington, Del., and Elbert C. Herrick, Boothwyn, Pa., assignors to E. I. du Pont de Nemours and Company, Wilmington, Del., a corporation of Delaware No Drawing. Application April 7, 1953,
Serial No. 347,408

11 Claims. (Cl. 260—2)

This invention relates to a catalytic process for preparing high molecular weight hydrocarbons. More particularly, it relates to a process for synthesizing high molecular weight polymethylenes from carbon monoxide and hydrogen.

It is well known that in the presence of specific catalysts and under certain conditions of temperature and pressure carbon monoxide and hydrogen react to give methanol and branched chain higher alcohols (Patart, U. S. 1,770,165). It is also known that under other reaction conditions involving the use of certain cobalt-containing or ruthenium-containing catalysts the reaction between carbon monoxide and hydrogen leads to the formation of paraffin waxes (Fischer et al. Brennstoff-Chemie 19, 226–30 (1938); ibid, 20, 247–50 (1939); cf. also U. S. Patents 2,351,345 and 2,352,328; Br. Patent 468,434). High molecular weight straight chain alcohols and other oxygen-containing organic compounds also have been obtained by hydrogenation of carbon monoxide in the presence of metals of the eighth group suspended in paraffin hydrocarbons ("Patent Applications in the Field of Fischer-Tropsch and Allied Reactions," vol. II, 1948, translated by Charles A. Meyer & Co., containing the following German patent applications of I. G. Farbenindustrie Aktiengesellschaft: R106 854 IV D/120, January 1940; O. Z. 14 718 J/z, April 25, 1944; O. Z. 14 225 January 8, 1943; O. Z. 14 226 June 8, 1943; O. Z. 12 880 July 5, 1941). In general, the waxes previously obtained were produced simultaneously with compounds of relatively low molecular weight (Fischer and Pichler, Brennstoff-Chemie 20, 247–50 (1939)), the average molecular weight of the reaction products being generally less than 1000. These previously known waxy reaction products contained ingredients which could be distilled at high temperatures and low pressures (200° C./2 mm.). A very recent development in this art is the discovery that the course of the CO—$H_2$ reaction in the presence of water and a ruthenium catalyst is determined by the pH of the medium; strongly alkaline media cause the formation of $C_2$ to $C_{10}$ alcohols rather than hydrocarbon waxes which are formed when the pH is on the acid side (Gresham, S. N. 99,343, filed June 15, 1949; Hager and Howk, S. N. 87,114, filed April 12, 1949; Gresham, S. N. 148,507, filed March 8, 1950). Another important recent development in this art is the discovery that macromolecular polymethylenes can be prepared from carbon monoxide and hydrogen in the presence of metal molybdite catalysts (Farlow and Herrick, S. N. 143,366, filed February 9, 1950 (refiled on September 21, 1950, as S. N. 186,112).

An object of this invention is to provide a process employing novel catalysts for the preparation of macromolecular hydrocarbon compositions of improved quality from carbon monoxide and hydrogen. Another object is to prepare relatively high melting polymethylenes in high yield. Other objects of the invention appear hereinafter.

It has been discovered, in accordance with this invention, that in the production of macromolecular polymethylenes from carbon monoxide and hydrogen, formation of lower molecular weight products is minimized by employing a metal tungstite catalyst. This invention provides a process for preparing macromolecular essentially hydrocarbon compositions of improved quality by introducing hydrogen and carbon monoxide into a reaction vessel, and heating the reactants in the presence of a catalyst containing a tungstite of at least one metal of the class consisting of Ni and Co, suitably at a pressure of at least 200 atmospheres, preferably 500 to 5000 atmospheres, at a temperature within the range of 125° to 300° C., preferably 150° to 250° C.

This invention provides radically new macromolecular hydrocarbon polymers, i. e. polymers which are essentially hydrocarbon in nature, which are characterized by having an inherent viscosity greater than 1.3, measured as a 0.1% solution in tetrahydronaphthalene at 125° C., which melt above 130° C., which show orientation along the fiber axis when subjected to cold drawing, and which yield films which are superior to films from previously known hydrocarbon polymers in their stiffness and breaking strength characteristics.

In one manner of producing the hydrocarbon polymers of this invention a pressure reactor is charged with a diluent and the tungstite catalyst, the reactor is swept with oxygen-free nitrogen, cooled to 0° C., and evacuated. The reactor is then pressured with a carbon monoxide/hydrogen gas mixture and the reaction mixture is heated to between 125° and 300° C. Throughout the period of reaction the pressure within the reactor is maintained above 200 atmospheres, preferably 500 to 5000 atmospheres, by repressuring with carbon monoxide/hydrogen gas mixture of the same or of different composition from that initially used. After reaction is complete, the reactor is permitted to cool, opened, and the contents discharged and filtered. The solid polymeric product is separated from the catalyst by extraction or by other means known to those skilled in the art.

The examples which follow are submitted to illustrate and not to limit this invention. Unless otherwise stated, parts are by weight.

*Example 1.*—A reaction mixture comprising 87 parts of xylene, 5 parts of mixed dodecyl acid phosphates, 20 parts of nickel tungstite and a gas mixture of 2 mols of hydrogen per mol of carbon monoxide was heated at 225° C. and 900 to 1000 atmospheres pressure, which was maintained over a 15-hour period by repressuring with the same gas mixture. At the completion of the run, the vessel was cooled, vented, its contents discharged and filtered. Extraction of the solid obtained with boiling heptane and addition of the hot heptane extract to methanol produced 0.80 part of solid polymer. A further extraction in the same manner with boiling xylene produced 1.85 parts of solid polymer having a microscopic melting point of 133° C., and an inherent viscosity of 1.89 measured at 0.1% concentration in tetrahydronaphthalene at 125° C.

*Example 2.*—A reaction mixture consisting of 90 parts of xylene and 20 parts of granular nickel tungstite, and a gas mixture composed of 2 mols of hydrogen per mol of carbon monoxide was heated at 225° C. and 900 to 1000 atmospheres pressure, which was maintained over a 15-hour period by repressuring with the same gas mixture. At the completion of the run the vessel was cooled, vented and its contents discharged.

The polymer and catalyst were separated from the reaction medium by centrifuging, and washed with acetone. The polymer was separated from the catalyst by extraction first with boiling benzene then with boiling xylene. The benzene extract was diluted with methanol and the precipitated polymer, separated by filtration, washing with acetone and drying, amounted to 0.8 part. From the xylene extracts, by a similar procedure, there was isolated 3 parts of essentially hydrocarbon polymer which was found to be orientable and to have an inherent viscosity of 1.33, measured at 0.1% concentration in tetrahydronaphthalene at 125° C.

*Example 3.*—A reaction mixture consisting of 80 parts of cyclohexane and 20 parts of a cobalt tungstite catalyst was heated under a pressure of hydrogen and carbon monoxide as in Example 2. There was isolated 2.15 parts of essentially hydrocarbon polymer which was found to be orientable by cold drawing.

*Example 4.*—A reaction mixture consisting of 90 parts of xylene, 20 parts of a mixed nickel-tungstite-molybdite and 5 parts of a commercial product consisting principally of mixed dodecyl acid phosphates was heated at 200° C. in the presence of hydrogen and carbon monoxide as in Example 2. The yield of essentially hydrocarbon polymer was 3.85 parts, of which 2.63 parts had an inherent viscosity of 1.44, measured at 0.1% concentration in tetrahydronaphthalene at 125° C.

*Example 5.*—A silver lined continuous catalytic converter containing 40 parts of 8–14 mesh nickel tungstite mixed with 80 parts of copper pellets, having approximately the particle size of the catalyst, was pressured with mixed gas composed of 1.6 moles of hydrogen per mole of carbon monoxide and heated to 225° C. The pressure inside the converter was adjusted to the operating level of 800 atmospheres. A stream of decahydronaphthalene and a stream of mixed gas were injected separately into a mixing block and fed into the top of the converter at a total pressure of 800 atmospheres. The mixed gas was injected at a space velocity of 0.31 part per part of catalyst per hour and the liquid was injected at a space velocity of 0.53 part per part of catalyst per hour. The operating pressure was maintained at 800 atmospheres by regulating the rate of gas bleed-off. The reaction product, obtained by bleed-off at 6-hour intervals, was filtered, washed with acetone, and dried. The yield of essentially hydrocarbon polymer amounted to 0.2 part per hour. The polymer was orientable by drawing and had a microscopic melting point of 130.4° C.

*Example 6.*—Example 5 was repeated except that the converter was charged with 66.5 parts of cobalt tungstite mixed with 100 parts of copper pellets. The yield of essentially hydrocarbon polymer amounted to 0.56 part per part of catalyst per hour.

*Example 7.*—A reaction mixture consisting of 80 parts of cyclohexane and 20 parts of an iron tungstite catalyst was heated at 250° C. under pressure of hydrogen and carbon monoxide as in Example 2. There was isolated 0.6 part of solid polymethylene. In similar tests, zinc tungstite and copper tungstite were employed in place of iron tungstite and were found to be active for production of solid polymethylene.

The nickel tungstite catalyst used in Examples 1 and 2 was prepared as follows.

Four moles of ammonium tungstate in a 10% aqueous solution, prepared by dissolving 1080 grams of ammonium paratungstate in 7000 cc. of water and 310 cc. of 28% aqueous ammonia at 85° C., was added to 4 moles of nickel nitrate in a 16% solution, prepared by dissolving 1163 grams of nickel nitrate in 6000 cc. of water at 85° C. A pale green precipitate was formed in a slurry having a pH of approximately 6. The pH of the slurry was adjusted to 7 at 75° C. by addition of 404 cc. of 28% aqueous ammonia. The resulting precipitate was washed, filtered, dried, and calcined at 400° C. The product thus obtained was charged into a furnace and heat treated at 400° C. in a stream of nitrogen at a space velocity of 390 l./hr. for 12 hours, cooled to room temperature in nitrogen and the product then reduced for 24 to 47 hours at 450° to 480° C. in hydrogen at a space velocity of 600 to 1,000 l./hr. The reduced product corresponded by analysis to nickel tungstite ($NiWO_2$) containing a slight excess of $W_2O_3$. The product was not spontaneously pyrophoric when exposed to air at room temperature. On warming slightly over a Bunsen flame, however, the product ignited with a bright glow and oxidized to yellow nickel tungstate.

The examples have illustrated the preferred aspects of preparing the hydrocarbon polymers of this invention, but it is to be understood that the conditions specified therein may be varied without departing from the scope or spirit of this invention.

The process can be operated as a batch or semi-continuous operation, or as a continuous down or up-flow operation. Whether for batch, semi-continuous, or continuous operation, the desired mixtures of carbon monoxide and hydrogen are readily made up on the basis of pressures, calculated by successive substitutions into the following equation:

$$P_{(of\ CO)} = \frac{(C_{initial\ CO})(P_{final})}{(C_{final\ CO}) + N(C_{final\ H_2})}$$

where P stands for pressure, C stands for the compressibility of the carbon monoxide and of the hydrogen at the indicated pressure, and N is the desired carbon monoxide/hydrogen mole ratio in the mixture.

The mole ratio of carbon monoxide to hydrogen in the gas mixture may vary from 10:1 to 1:5. Usually mole ratios of 3:1 to 1:2 are used because gas mixtures in this range of composition give omptimum results from the standpoint of yield of desired high molecular weight hydrocarbon polymer.

The temperature at which the hydrogenation of the carbon monoxide is effected lies in the range of 125° to 300° C. Because good reaction rates with best yields of desired high molecular weight hydrocarbons are obtained in the range of 150° to 250° C., this range embraces the preferred operating temperature conditions.

The process is generally carried out under a total pressure of at least 200 atmospheres. Because maximum rates of production of desired high molecular weight products are achieved using pressures in excess of 500 atmospheres, the use of such pressures is economical and embraces a preferred aspect of operation. The upper limit of pressure is not critical, and the maximum is determined by the mechanical restrictions of the equipment employed. Since the use of the pressures in excess of 5000 atmospheres does not lead to any compensating advantages from the standpoint of yield of desired high molecular weight essentially hydrocarbon polymer or economy of operation, it represents the practical upper limit of pressure.

Since the reaction is highly exothermic, it is desirable to operate in the presence of a reaction medium, which in addition to aiding in the dissipation of the heat of reaction also functions to bring about better catalyst contact and hence improve the efficiency of the process. Suitable media are water, aromatic and aliphatic hydrocarbons, alcohols, and the like.

If desired, there may be incorporated into the reaction medium an acid material such as a mineral acid, for example, phosphoric acid; or an alkyl acid phosphate, for example, didodecyl acid phosphate, etc. The process can also be operated in the presence of alkaline materials such as the alkali metal carbonates or hydroxides.

The reaction media can occupy up to 80% (or more) or as little as 5% (or even less) of the reactor volume when operating as a batch process. Generally, however, the reaction medium occupies between 30 and 50% of the reactor volume.

Although melting point is an important physical property, in itself it is not sufficient to characterize the hydrocarbon polymers as being suitable for conversion to superior films and fibers. Melting point can be reduced by the presence of small amounts of low molecular weight material without affecting other properties, which are determinants in the utility of the products for film and fiber applications. Thus, polymers melting below 130° C. are useful for conversion to such films and fibers if their inherent viscosity is at least 1.3, measured at 0.10% concentration in tetrahydronaphthalene at 125° C.

The melting points specified in the examples represent the temperature at which complete disappearance of the crystalline structure is observed under a polarizing microscope.

The time of reaction depends upon such interdependent variables as temperature, pressure, and amount and type of catalyst employed. Under the preferred conditions for batch operation the desired degree of reaction is reached in from 5 to 20 hours.

The catalyst used in the preparation of the hydrocarbon polymers of this invention are the tungstites described in the copending application of Arnold and Carnahan, U. S. Ser. No. 208,662, filed January 30, 1951. The Arnold and Carnahan patent application discloses the preparation of metal tungstites corresponding in composition to metal salts of an acid having one of the formulae $H_2WO_2$ and $H_2WO_3$, by reacting in the presence of excess ammonia, stoichiometric proportions of normal ammonium tungstate with a salt of the metal whose tungstite is desired, washing the precipitate which forms, filtering it, drying it, and then calcining it for from 4 to 24 hours at 350 to 500° C. Examples of water-soluble salts which may be employed to produce the corresponding tungstites are copper sulfate, copper chloride, nickel sulfate, nickel chloride, nickel acetate, thorium nitrate, thorium chloride, manganese chloride, zinc chloride, zinc sulfate, zinc permanganate, iron nitrate, iron chloride, silver nitrate, cadmium chloride, cadmium nitrate, stannous chloride, stannous fluoride, stannic sulfate, cobalt nitrate, cobalt chloride and the like. Preferred catalysts because of their high degree of activity and selectivity are the tungstites of nickel and cobalt. These tungstites may contain modifiers or promoters such as barium, cadmium, chromium, thorium, cobalt, copper, etc., as desired, and they may be employed in the form of pellets or as finely divided powders. They may also be used as such or blended with molybdites of the type disclosed and claimed in the copending application of H. R. Arnold and J. E. Carnahan, U. S. Ser. No. 111,982, filed August 23, 1949, as illustrated in Example 4. These tungstites may be extended on inert supports such as charcoal, alumina, silica, etc., or they may be unsupported. The particular form of catalyst for maximum activity depends upon the conditions under which the hydrogenation is to be effected. Thus, for vapor or liquid phase operation it is best to have the catalysts in the form of pellets, thus minimizing mechanical losses. If the process is to be operated as a batch operation, it is best that the catalyst be in finely divided form because in this way maximum catalyst activity is realized.

Example 5 illustrates the use of nickel tungstite mixed with copper pellets as the catalyst. The copper pellets function as a heat transfer medium and permit better temperature control of the reaction. In place of copper other metals in pellet form may be used, such as aluminum, iron, etc.

The amount of catalyst employed depends upon such interdependent variables as temperature, pressure, desired mode of operation, desired duration of contact time if in continuous operation, etc. As a rule, in batch operation the amount of catalyst will be between 1.5 and 30% and preferably between 2.5% and 20% by weight of the reaction medium.

In continuous operation the weight of product in the reactor at any time is ordinarily less than the weight of the catalyst, but the total weight of material processed during the active life of the catalyst is at least 10 times the catalyst weight.

The surface of the reactor in contact with the reactants appears to be an important factor in determining the molecular weight and yield of hydrocarbon polymer obtained. Silver, copper, or stainless steel surfaces are satisfactory.

The process of this invention makes it possible to convert carbon monoxide into solid products which are virtually all high molecular weight. These solid products, without further purification, have molecular weights of at least 26,000, and inherent viscosities of at least 1.3. They are convertible into fibers and films having strength and tenacity characteristics exceeding those of hitherto available synthetic hydrocarbon polymer films and fibers.

High bulk density (0.97, or somewhat higher) characterizes the products obtained by the process of this invention. By infra red analysis it has been found that these products have essentially no side chain substituents, hence they differ strucurally from polyethylene.

This application is a continuation-in-part of our copending application, S. N. 208,661, filed January 20, 1951, now abandoned.

We claim:

1. A process for preparing macromolecular essentially hydrocarbon compositions which comprises heating carbon monoxide with hydrogen at a temperature within the range of 125° to 300° C. under a pressure of at least 200 atmospheres in the presence of a metal tungstite catalyst, said metal tungstite catalyst being a metal salt of an acid of the formula $H_2WO_n$ wherein $n$ is an integer from 2 to 3 inclusive, whereby a macromolecular essentially hydrocarbon composition is produced.

2. A process for preparing macromolecular essentially hydrocarbon compositions which comprises heating carbon monoxide with hydrogen at a temperature within the range of 125° to 300° C. under a pressure of at least 200 atmospheres in the presence of a catalyst containing a tungstite of a metal of the class consisting of Ni and Co whereby a macromolecular essentially hydrocarbon composition is produced.

3. The process set forth in claim 2 in which the pressure is within the range of 500 to 5000 atmospheres.

4. The process set forth in claim 3 in which the temperature is within the range of 150° to 250° C.

5. The process of claim 4 in which the catalyst is a mixed nickel-tungstite-molybdite catalyst.

6. The process of claim 4 in which the catalyst is nickel tungstite.

7. The process of claim 4 in which the catalyst is cobalt tungstite.

8. The process of claim 4 carried out in the presence of an inert organic liquid medium.

9. The process of claim 8 in which the said inert organic liquid medium is a hydrocarbon.

10. The process of claim 9 in which the said hydrocarbon is xylene.

11. A process for preparing macromolecular essentially hydrocarbon compositions which comprises heating two mole proportions of hydrogen with one mole proportion of carbon monoxide at a temperature of 225° C. under 900 to 1000 atmospheres pressure in the presence of xylene as an inert reaction medium and in the presence of a nickel tungstite catalyst whereby a macromolecular hydrocarbon composition having an intrinsic viscosity of 1.33, measured at 0.1% concentration in tetrahydronaphthalene at 125° C. is obtained, and thereafter separating the said macromolecular essentially hydrocarbon composition from the resulting mixture.

References Cited in the file of this patent

UNITED STATES PATENTS 2,652,372     Farlow  ---------------  Sept. 15, 1953